Sept. 7, 1965     S. MERMELSTEIN     3,204,477
BAND ACTUATOR FOR BALL-DISC INTEGRATOR
Filed Dec. 20, 1963     4 Sheets-Sheet 1

SEYMOUR MERMELSTEIN
*INVENTOR.*

BY

Thomas W. Kennedy
ATTORNEY

Sept. 7, 1965  S. MERMELSTEIN  3,204,477
BAND ACTUATOR FOR BALL-DISC INTEGRATOR
Filed Dec. 20, 1963  4 Sheets-Sheet 2

SEYMOUR MERMELSTEIN
INVENTOR.

BY

Thomas W. Kennedy
ATTORNEY

Sept. 7, 1965 S. MERMELSTEIN 3,204,477
BAND ACTUATOR FOR BALL-DISC INTEGRATOR
Filed Dec. 20, 1963 4 Sheets-Sheet 3

SEYMOUR MERMELSTEIN
*INVENTOR.*

BY

*Thomas W. Kennedy*
ATTORNEY

Sept. 7, 1965  S. MERMELSTEIN  3,204,477
BAND ACTUATOR FOR BALL-DISC INTEGRATOR
Filed Dec. 20, 1963  4 Sheets-Sheet 4

SEYMOUR MERMELSTEIN
INVENTOR.

BY

Thomas W. Kennedy
ATTORNEY

United States Patent Office 3,204,477
Patented Sept. 7, 1965

3,204,477
BAND ACTUATOR FOR BALL-DISC INTEGRATOR
Seymour Mermelstein, Brooklyn, N.Y., assignor to General Precision, Inc., Little Falls, N.J., a corporation of Delaware
Filed Dec. 20, 1963, Ser. No. 332,157
7 Claims. (Cl. 74—198)

The present invention relates to computing integrators and more particularly to a ball-disc type of integrator.

The invention is particularly useful in connection with ball-disc integrators similar to that disclosed in U.S. Patent No. 2,602,338 although, as will become apparent, this invention is not limited to this specific type of integrator. In the following description the invention is described in relation to a ball-disc type of transmission in a computing integrator, but the invention is also suitable to other forms of variable-speed transmissions and integrators.

A computing integrator as disclosed in the above-mentioned patent comprises essentially a rotatable disc carried by an input shaft, a rotatable cylinder carried by an output shaft and disposed on an axis normal to the axis of the disc, and a pair of contacting balls engaging the disc and cylinder, respectively, and adjustable along a path radial of the disc and paralleling the axis of the cylinder. For the purpose of such adjustment, the balls are contained in a ball carriage which moves in the described path. Actuating means are provided for traversing the ball carriage with respect to the diameter of the disc and the longitudinal axis of the cylinder.

One type of ball-carriage actuator, which has been previously used in such an integrator, is a rack and pinion mechanism similar to that disclosed in the U.S. Patent No. 2,881,623. One problem with the rack and pinion mechanism is that lost motion or backlash occurs when the rack and pinion mechanism reverses direction, particularly due to wear in its gear teeth after extended operation. Attempts to prevent such backlash by preloading the gear teeth have caused misalignment in the associated pinion shaft, which extends outside the integrator, and has accelerated mesh friction and wear in the gear teeth of the rack and pinion mechanism. Thus, this type of actuating mechanism either has too much backlash or too short a service life.

A second type of carriage actuating mechanism, which has been previously used, is a mechanism incorporating a precision lead screw having a very fine pitch thread and a special nut which minimizes backlash. However, since it is necessary to move the carriage of a computing integrator at high velocities in order to keep up with large changes in input, this type of lead-screw mechanism must operate at very high rotational speeds, and this causes severe wearing of the threads and other portions after extended operation of the mechanism. Thus, this second type of actuating mechanism also has a limited service life.

Accordingly, it is one object of the invention to minimize ball-carriage backlash or lost motion in a ball-disc computing integrator.

It is another object of the invention to provide a gearless ball-carriage actuator suitable for providing reversible, high-speed actuation of the carriage in a ball-disc computing integrator over extended periods of operation.

It is a further object of the invention to provide a backlash-free actuator for a variable-speed transmission.

To the fulfillment of these and other objects, the invention provides actuating means for a ball-disc integrator comprising a pair of pre-tensioned drive bands, offset from one another, parallel to each other, and parallel to the prescribed direction of movement of the ball carriage, with one of the bands being fixedly connected to a portion of the ball carriage. The actuating means also comprises an input or drive shaft and an idling shaft, which are disposed at opposite ends of the bands so that each band has one end connected to the input shaft and the opposite end connected to the idling shaft. The adjacent ends of each band are tangentially disposed on opposite sides of the shaft surface of each shaft and fixedly connected to adjacent sections of each shaft, so that as the input shaft is rotated, one band moves away from the input shaft and the other band moves toward the input shaft, and so that the tension in one band is equalized by the tension in the other band by the balancing of the torques which the bands apply to the idle shaft.

Other objects of the invention will become apparent upon reading the annexed detailed description in connection with the drawings in which.

Figure 1:
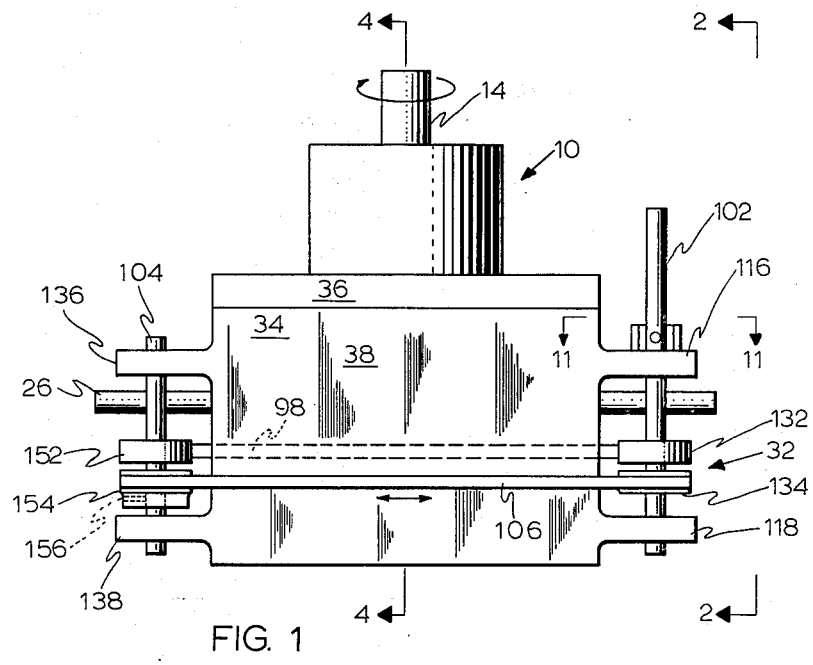
FIGURE 1 is a view of an integrator embodying the present invention.
Figure 3:
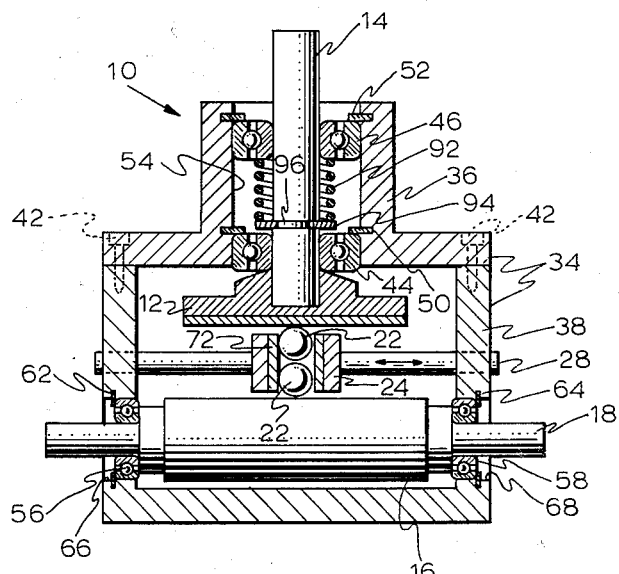
FIGURE 3 is a longitudinal sectional view taken on line 3—3 of FIGURE 2.
Figure 2:
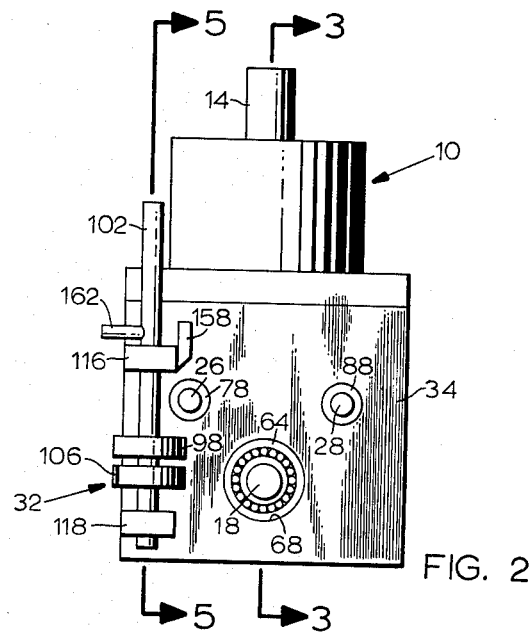
FIGURE 2 is a view of the integrator as viewed from line 2—2 of FIGURE 1 looking in the direction of the arrows.

Referring to the drawings, the illustrated embodiment 10 of the present invention comprises: a rotatable disc 12 secured to an input shaft 14; a rotatable cylinder 16 carried by an output shaft 18 and disposed on an axis normal to the axis of the disc 12; and a pair of contacting balls 22 engaging the disc 12 and cylinder 16, respectively, and adjustable along a path radial of the disc 12 and paralleling the axis of the cylinder 16 by means of a ball carriage 24, in which the balls 22 are closely fitted. The ball carriage 24 is supported and guided by carriage guides 26, 28, and is translated or displaced by carriage-actuating means 32. A housing 34 is provided for integrator 10 having walls including a cap or upper wall 36, in which disc input shaft 14 is mounted, and a base 38 with end wall portions, in which cylinder output shaft 18 and carriage guides 26 and 28 are mounted. Cap wall 36 is secured to base 38 by screws 42, or the like.

The disc input shaft 14, which has the disc 12 secured to one end thereof, is rotatably mounted in the housing cap 36 by means such as ball bearing and race assemblies 44, 46 retained against movement outwardly of the housing cap 36 by arcuate spring metal retainers or snap rings 50, 52 seated in circular recesses within a central bore 54 in the housing cap 36.

Output shaft 18, which carries cylinder 16, is rotatably mounted in the housing base 38 in a generally similar manner by means of ball bearing and race assemblies 56, 58 retained against movement outwardly of the housing base by arcuate spring metal retainers or snap rings 62, 64 seated in circular grooves in each of two axially aligned horizontal bores 66, 68 in the housing base 38.

The balls 22 are preferably constrained to a position in which a line drawn through their contact with each other, with the disc 12, and with the cylinder 16, lies substantially in a plane through the axes of input and output shafts 14 and 18, respectively.

The ball carriage 24 preferably has a cylindrical a sleeve 72 around balls 22 with the sleeve inner diameter being slightly larger than the outer diameter of each ball and consisting of a material which imposes a minimum friction load on the balls.

Figure 4:
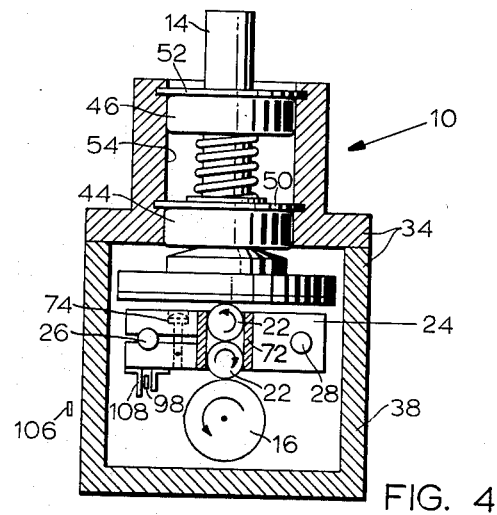
FIGURE 4 is a transverse sectional view taken on line 4—4 of FIGURE 1.

Parallel carriage guides 26, 28 are mounted in the opposite end walls of the housing base 38 for supporting and guiding carriage 34. As best appears in FIGURE 4, carriage guide 26 is secured to carriage 24 as by screws 74 adapted to clamp bifurcate portions of the carriage 24 against opposite sides of guide 26.

Guide 26 is slidably mounted in bushings 76, 78 in opposite end walls of housing base 38 to permit reversible translation of guide 26 with carriage 24. Guide 28 is stationary, and carriage 24 is slidably mounted on guide 28. Stationary guide 28 is fixedly mounted in bushings 82, 84, inside opposite walls of housing base 38, and secured against axial displacement by means such as arcuate retainers, 86, 88 of spring material, seated in circular recesses in said guide 28.

To assure that the rotation of the input shaft 14 will be imparted to the cylinder 16 and cylinder output shaft 18 through the balls 22, when the ball carriage 24 has positioned the balls 22 at any place between the exact center of the disc 12 and its edge, means are provided to exert a relatively strong pressure through disc 12 against balls 22 and cylinder 16. For this purpose, a coiled spring 92, surrounding disc input shaft 14 is compressed between the inner race of the upper ball bearing and race assembly 46 and an arcuate spring retainer 94 retained in a circular groove 96 in input shaft 14.

The integrator so far described is substantially similar to the integrator disclosed in the aforementioned U.S. Patent No. 2,602,338 and for additional description reference is made to said patent.

According to the invention, the ball carriage actuating means 32 includes an elongated drive band or tape 98, one end of which is fixedly wrapped around a carriage input shaft 102, and the other end of which is fixedly wrapped around an idler or follower shaft 104 in a manner particularly described herein below. Drive band 98 is disposed parallel to the direction of travel of carriage 24. Carriage input shaft 102 and follower shaft 104 are disposed transverse to drive band 98, are parallel to each other and to disc input shaft 14. The carriage actuating means 32 also has a return band 106 with each of its ends similarly wrapped around input shaft 102 and follower shaft 104, but on the sides of the respective shafts diametrically opposite to said drive band 98 and offset slightly axially to said drive band 98. Input shaft 102 is caused to rotate preferably by another device (not shown), which is connected to the upper end of input shaft 102 as illustrated in FIGURE 1.

Figure 8:
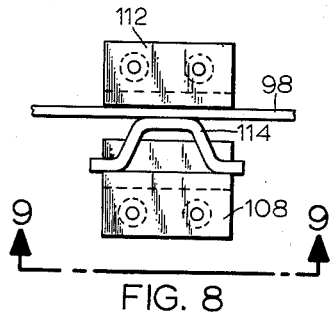
FIGURE 8 is a sectional view taken on line 8—8 of FIGURE 5.
Figure 9:
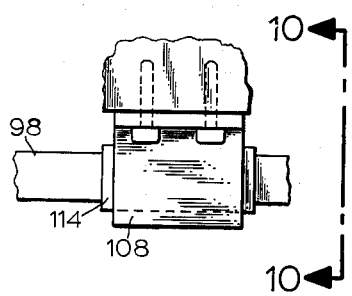
FIGURE 9 is a sectional view on line 9—9 of FIGURE 8.
Figure 10:
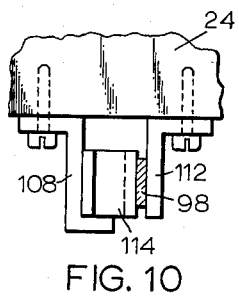
FIGURE 10 is a sectional view on line 10—10 of FIGURE 9.

As illustrated in FIGURES 8, 9 and 10, drive band 98 is fixedly connected to carriage 24 by clip angles 108, 112 and clip spring 114. Clip angle 112 bears against band 98 and angle 108 bears against clip spring 114, so that the pressure of the clip spring 114 against band 98 holds the band in place relative to the clip angle 112 and relative to the carriage 24. Each clip angle 108, 112 is positioned and supported by the carriage 24 being connected thereto by screws or like means. Drive band 98 is disposed substantially parallel to the path of travel of said balls 22 and said carriage 24, that is, diametrically of the disc 12 and paralleling the axis of the cylinder 16. Drive band 98 has a common reversible translation or movement with carriage 24 at their interconnecting portion. Band 98 is tightly stretched between said shafts 102 and 104, with each end of band 98 being fixedly connected to the adjacent shaft 102 or 104 respectively. A portion of each end of band 98 is wrapped around the spool portions of adjacent shaft 102 or 104 for a distance limited to an arc less than the shaft circumference to prevent overlapping. In this way, any slight transverse displacement of band 98 is prevented which might be caused by an overlapping of the band on its shaft. With this construction, band 98 can be pre-loaded in tension, which minimizes any sag in itst catenary span and minimizes any looseness in its connections with shafts 102, 104, thereby assuring that carriage actuating means 32 will be free of backlash and lost motion. The material of band or tape 98 is preferably metal, and preferably a low-expansion alloy, such as Elgiloy, or the like, which has desirable tensile and endurance properties, and is commercially available in precision rolled strips.

Carriage input shaft 102, which is transverse to band 98, is preferably parallel to disc input shaft 14. Housing base 38 has supporting brackets 116, 118 on the exterior face of one end wall thereof for supporting input shaft 102. As illustrated in FIGURE 1, support brackets 116 and 118 have bores which are coaxial with each other and with carriage shaft 102. Bracket 116 is adjacent the upper end of shaft 102 and of housing base 38, and bracket 118 is adjacent the bottom end of shaft 102 and of housing base 38. Carriage shaft 102 is mounted in brackets 116, 118 by means such as ball bearing and race assemblies 122, 124 retained against movement downwardly of the brackets 116, 118 by arcuate spring retainers or snap rings 126, 128. Spring retainers 126, 128 are seated in circular recesses within the coaxial bores located respectively in the top and bottom support brackets 116, 118.

Input shaft 102 has spools 132, 134 respectively, which are preferably fixedly connected thereto and coaxial with shaft 102. Each spool 132, 134 is fixedly connected to the end edge of its band by a recessed pin, or the like. The inner surface of drive band 98 is tangent to the perimeter and outer surface of top spool 132, and return band 106 is similarly tangent to bottom spool 134. The diameter of each spool 132, 134 is substantially larger than the diameter of carriage shaft 102, the spool diameters preferably being equal to each other. As mentioned before, it is desirable that the ends of the bands 98 and 106 do not overlap themselves. Without a spool, the shaft diameter would have to be very large. However, by the use of spools 132, 134 having an outer diameter substantially larger than the shaft, it is possible to use and provide a small-diameter light-weight carriage shaft 102.

Follower shaft 104 is similarly arranged transverse to drive band 98 at the other end of the band 98, and is substantially parallel to both the carrier shaft 102 and the disc input shaft 14. Follower shaft 104 is offset preferably the same distance from cylinder output shaft 18 as is carriage shaft 102. Housing base 38 has support brackets 136, 138 on the exterior side of its other end wall for supporting follower shaft 104. For this purpose, support brackets 136, 138 have ball bearing and race assemblies 142, 144 respectively and have arcuate spring retainers 146, 148 respectively for mounting follower shaft 104, similar to those for carriage input shaft 102. Follower shaft 104 also has similar spools 152 and 154 which are fixedly mounted on, and coaxial with, said shaft 104. Drive band 98 is wrapped around top spool 152, and return band 106 is wrapped around bottom spool 154, for an arc less than their circumference respectively, in the manner similar to input shaft spools 132, 134. Spools 152, 154 for follower shaft 104 preferably have the same diameter and are equal in diameter to spools 132, 134 of carriage input shaft 102.

Return band 106 is preferably the same size and material as drive band 98, and is preferably parallel lengthwise to drive band 98. Return band 106 and its spools 134 and 154 are preferably equidistant respectively from drive band 98 and its spools 132 and 152 respectively. Return band 106 is tangent to its spools 134 and 154 on the side of said spools which is diametrically opposite to that of drive band 98. Return band 106 is pre-loaded in tension at the same time and in the same amount as is drive band 98. The tension at all times in return band 106 and drive band 98 equalize one another because follower shaft 104 and its spools 152, 154 freely rotate in a manner, by analogy, similar to an idle shaft. Thus, when carriage input shaft 102 rotates, each and every point on the inner surface of drive band 98 and return band 106 and on the outer surface of spools 132, 134, 152 and 154 travels at subsantially the same speed. In addition, spools 132, 134, 152 and 154, and follower shaft 104 rotate at substantially the identical speed as carriage input shaft 102. Therefore, with this construction, the tension in each portion of the drive band 98 on either side of the carriage clip angles 108, 112 is automatically equalized thereby preventing backlash so that there can be no error in the integration process and there can be no drop in accuracy after long operation due to inequalities in the forward and reverse actuating forces.

Figure 7:
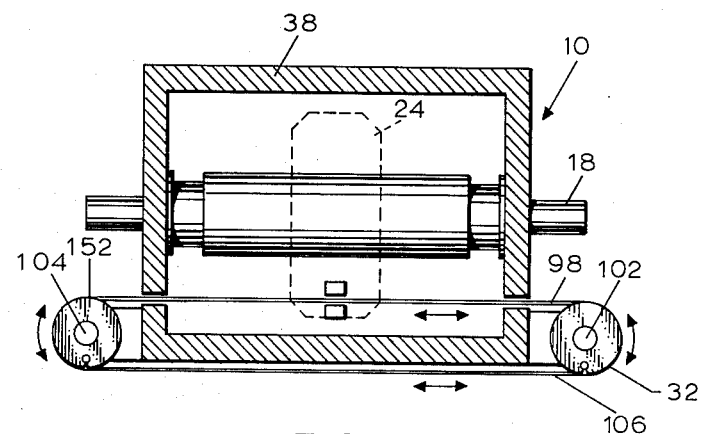
FIGURE 7 is another sectional view taken on line 7—7 of FIGURE 5.
Figure 5:
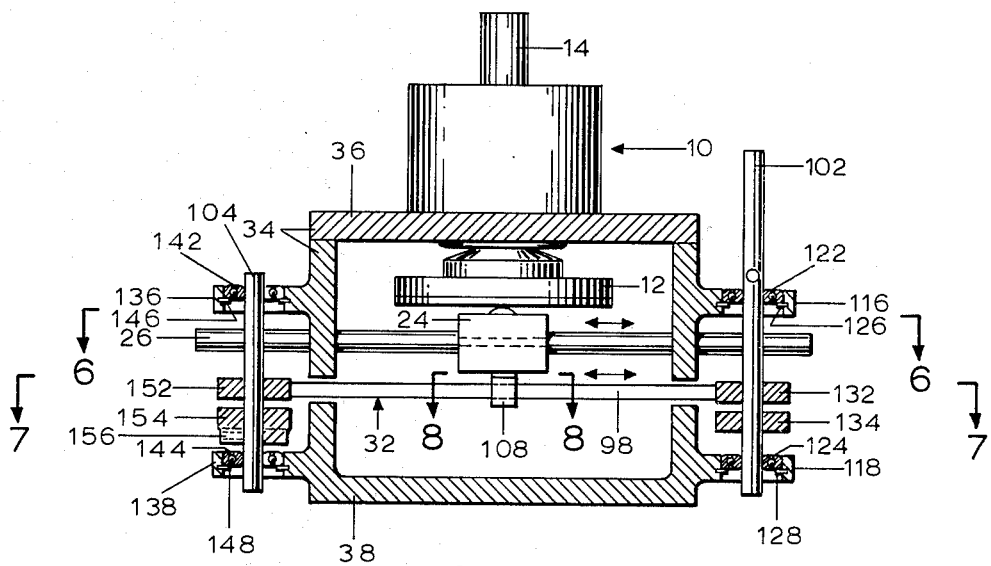
FIGURE 5 is a sectional view taken on line 5—5 of FIGURE 2.
Figure 6:
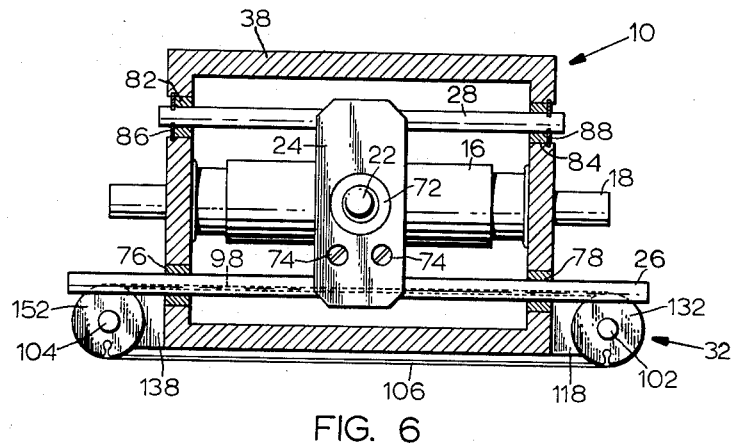
FIGURE 6 is a sectional view taken on line 6—6 of FIGURE 5.

In the operation of this integrator 10, the portion of the drive band 98 between the carriage clip angles 108, 112 and the top spool 133 of carriage input shaft 102 acts as a tension member, as most clearly illustrated in FIGURE 7, to move the carriage to the right, as carriage input shaft and spools 132, 134 rotate in a clockwise direction. When reversing direction of the carriage 24, the portion of the drive band 98 between the carriage clip angles 108, 112 and the top spool 152 of the follower shaft 104 acts as a tension member, and the return band 106 acts as a tension member cooperating therewith, to move the carriage 24 to the left, as similarly illustrated in FIGURE 7, when the carriage input shaft 102 rotates counterclockwise.

In order to pre-load the bands 98, 106 in tension, bottom spool 154 on follower shaft 104 is provided with means to free the spool 154 for rotation relative to its shaft 104. For this purpose, bottom spool 154 has a locking means, such as a set screw 156, or the like, which can be loosened so that the spool can move relative to its shaft, or can be tightened so that the spool 154 is fixedly connected to the shaft 104. When spool 154 is made free of its shaft, the desired tension can be produced in the system and then locked in. To do this, follower shaft 104 is mechanically constrained and a torque is then applied to the adjustable spool 154 by means such as a torque wrench. The carriage input shaft 102 is meanwhile left free to rotate. Since bands 98 and 106 act in opposition, the same tensile load is then developed in each band; and then the tensile load is locked in by clamping adjustable spool 154 to its shaft by means by its clip angles 108, 112. In this way, the initial pre- in this manner, the carriage is clamped to drive band 98 by its clip angles 108, 112. In this way, th initial pre-tension load is installed in the bands 98, 106. The amount of tension load to be installed in the system need only be slightly more than that which is required to accelerate the carriage load and also to compensate for slight thermal changes. Since the force necessary to move the carriage 24 is only a relatively small percentage of the allowable tensile strength of the metal drive band 98 or return band 106, the stress in the bands is only nominal. Therefore, a long service life can be expected with the bands 98, 106; and the ball carriage actuating means 32 can be expected to have a non-degenerating accuracy even at high speeds during extended operation. With this construction, the ball carriage actuating means 32 will exhibit substantially zero backlash during said extended operation.

Figure 11:
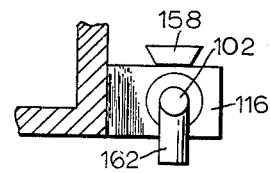
FIGURE 11 is a sectional view on line 11—11 of FIGURE 1.

Support bracket 116 adjacent to carriage input shaft 102 has a stop block 158; and input shaft 102 has a stop arm 162 as illustrated in FIGURE 11. With this preferred construction, the carriage input shaft 102 is unable to rotate a full revolution, and this prevents an overloading in the bands 98, 106 at the extremes of the travel of carriage 24.

The band and spool combination provided in the ball-disc integrator 10 in accordance with the invention has certain advantages. The angular displacement of the input shaft spools 132, 134 is readily converted to linear translation in bands 98, 106. Therefore, very slight and very rapid angular movements of the carriage input shaft 102 are accurately recorded through the contacting balls 22. This feature when incorporated in a ball-disc integrator, provides a precise integration of step functions. In addition, the band and spool combination permits a wrap-around connection with pre-loaded parts. This additional feature assures that there is substantially no movement of the spool relative to the band. Obviously, such a backlash-free connection cannot be as easily achieved using gear teeth such as in a rack and pinion mechanism. Moreover, the band type of drive has practically no inherent friction in itself. This is in contrast to other types of prior art tension, such as a chain drive, which has a large inherent friction. Thus, the use of a band drive minimizes bearing and other working stresses in the tension drive member. Further, with the use of a metal band, the thickness of the band can be very thin relative to the diameter of its spool and drive shaft and still have a high factor of safety in strength. Such a thin section band requires a relatively small bending torque for wrapping around its spool and such a low torque minimizes the working load in the tension drive member.

The ball carriage actuating means 32 in accordance with the invention substantially deletes backlash and lost motion in the operation of the ball-disc integrator 10. The forces necessary to overcome the inherent friction and inertia of all the parts in the ball carriage actuating means 32 are very small relative to the forces necessary for this purpose in the prior art forms of ball-carriage actuating means, so that the ball carriage actuating means 32 in accordance with the invention can be driven by highly sensitive torquer motors and tiny servo motors. Moreover, since the angular rotation of the carriage input shaft 102 of the actuating means 32 is preferably less than 360°, a conventional torquer device with this rotational range can be directly connected with the integrator 10. Thus, such a combination of a conventional torquer, and an integrator 10 in accordance with the invention, can be provided, which would approach the accuracy of present-day electronic integrators, and furthermore, would have other relative advantages, such as being a smaller package.

While the present invention has been described in detail in its present preferred embodiment it will be obvious to those skilled in the art after understanding this invention that various changes and modifications may be made therein without departing from the spirit or scope thereof. It is intended by the appended claims to cover all such modifications.

What is claimed is:

1. In a variable-speed transmission including:
    a pair of members disposed in driving engagement with each other;
    at least one of said members being circular in a cross-section taken in a plane at a right angle to the plane in which it engages the other of said members;
    means for causing one of said members to roll over the surface of the other in a path constantly changing in direction;
    means for adjustably positioning said rolling member including a taut pre-loaded band and carriage means connecting to said band and engaging said rolling member for reversible displacement of said rolling member; and
    an input drive means engaging said band and regulating the movements of said band for varying the speed of said rolling member.

2. In a variable-speed transmission having a rotatable input disc, output means rotatable about an axis other than that of said disc, and driving means disposed between said disc and said output means, said driving means comprising:
torque transmitting means disposed in driving engagement between said disc and said output means;
means adjustable relative to said disc and said output means for controlling the position of said torque transmitting means;
said control means comprising a pre-loaded tension band connected to said transmitting means for reversible translation of said transmitting means; and
an input drive means engaging said band and regulating the movements of said band for varying the speed of said output means.

3. A computing integrator comprising:
a rotatable input member with a friction drive face;
an output member rotatable on an axis normal to the axis of rotation of said input member;
a torque transmitting means in driving engagement with said input drive face and reversibly movable relative to said input member, and adjustable axially of said output member for variable speed driving of said output member; and
speed regulating means comprising a backlash-free preloaded tension band in driving connection with said transmitting means and an input drive means in driving engagement with said band for varying the speed of said output member.

4. A computing integrator comprising:
a rotatable disc;
a cylinder rotatable on an axis normal to the axis of rotation of said disc;
a torque transmitting means in driving engagement with said disc and reversibly movable relative to said disc, and adjustable axially of said cylinder for variable-speed driving of said cylinder; and
speed regulating means comprising a backlash-free preloaded tension band in driving connection with said transmitting means and input drive means in driving engagement with said band for varying the speed of said cylinder.

5. A computing integrator comprising:
a rotatable input member with a friction drive face;
a rotatable output member rotatable on an axis normal to the axis of rotation of said input member;
driving means between said disc and cylinder including:
a carriage adjustable axially of said output member and radially of said input member;
a pair of balls disposed within said carriage and respectively in driving engagement with said input member, said output member and each other; and
carriage actuating means comprising:
a backlash-free pre-loaded tension band in driving connection with said carriage for reversibly translating said carriage; and
a carriage input drive means in driving engagement with said band for regulating the movements of said band to control the speed of said output member.

6. In a computing integrator having a rotatable disc and a cylinder rotatable on an axis normal to the axis of rotation of said disc, driving means between said disc and cylinder including
a carriage adjustable axially of said cylinder and radially of said disc;
a pair of balls disposed within said carriage and respectively in driving engagement with said disc, said cylinder and each other; and
carriage actuating means comprising:
a backlash-free, pre-tensioned, flexible band connected to said carriage for reversibly translating said carriage; and
input drive means in driving engagement with said band for regulating the movements of said band to control the speed of said cylinder.

7. A computing integrator having:
a rotatable disc;
a cylinder rotatable on an axis normal to the axis of rotation of said disc; and
driving means between said disc and cylinder including:
a carriage adjustable axially of said cylinder and radially of said disc;
guide members supporting and guiding said carriage;
a pair of balls disposed within said carriage and respectively in driving engagement with said disc, said cylinder and each other; and
carriage actuating means comprising:
a backlash-free, pre-tensioned, flexible band connecting to said carriage for reversible translation thereof;
a rotatable drive member having a peripheral surface portion connecting to one end of said band and being overlapped by a band portion adjacent said band end;
a rotatable follower member having a peripheral surface portion connecting to the other end of said band and being overlapped by a band portion adjacent said other band end; and
means interconnecting said drive and follower members to provide joint, reversible movement of said members and identical travel of all points on their overlapped surfaces and to maintain equal tautness over the entire length of said drive band.

References Cited by the Examiner
UNITED STATES PATENTS
2,602,338   7/52   Opocensky et al. _____ 74—198
2,881,623   4/59   Eldridge _____ 74—198

DON A. WAITE, *Primary Examiner.*